US00RE42796E

(19) United States
(12) Reissued Patent
Ishii

(10) Patent Number: US RE42,796 E
(45) Date of Reissued Patent: Oct. 4, 2011

(54) DEVELOPING CARTRIDGE, PROCESS UNIT, AND IMAGE FORMING APPARATUS

(75) Inventor: Makoto Ishii, Nagoya (JP)

(73) Assignee: Brother Kogyo Kabushiki Kaisha, Nagoya (JP)

(21) Appl. No.: 11/826,188

(22) Filed: Jul. 12, 2007

Related U.S. Patent Documents

Reissue of:
(64) Patent No.: 7,116,919
Issued: Oct. 3, 2006
Appl. No.: 10/891,142
Filed: Jul. 15, 2004

(30) Foreign Application Priority Data

Aug. 7, 2003 (JP) ..... 2003-206595

(51) Int. Cl.
*G03G 15/00* (2006.01)

(52) U.S. Cl. ..... 399/12; 399/13; 399/111; 399/119; 399/120

(58) Field of Classification Search ..... 399/12, 399/13, 24, 25, 27, 111, 113, 119, 167, 262
See application file for complete search history.

(56) References Cited

U.S. PATENT DOCUMENTS

| | | | |
|---|---|---|---|
| 5,038,173 | A | 8/1991 | Kusumoto |
| 5,053,816 | A | 10/1991 | Takahashi |
| 5,325,157 | A | 6/1994 | Takano |
| 5,384,629 | A | 1/1995 | Watanabe et al. |
| 5,430,780 | A | 7/1995 | Takeda et al. |
| 6,163,660 | A | 12/2000 | Maeshima et al. |
| 6,298,202 | B1 | 10/2001 | Fushiya et al. |

FOREIGN PATENT DOCUMENTS

| | | |
|---|---|---|
| EP | 0 577 416 A1 | 1/1994 |
| JP | A-3-279965 | 12/1991 |
| JP | A 3-279965 | 12/1991 |
| JP | A-6-19308 | 1/1994 |
| JP | A-09-258634 | 10/1997 |
| JP | A-2000-221781 | 8/2000 |
| JP | A 2003-107976 | 4/2003 |
| JP | A-2003-140453 | 5/2003 |

OTHER PUBLICATIONS

Jan. 29, 2010 Office Action issued in Korean Patent Application No. 10-2004-0061872 (with translation).

*Primary Examiner* — Hoang Ngo
(74) *Attorney, Agent, or Firm* — Oliff & Berridge, PLC

(57) ABSTRACT

A developing cartridge removably set in a laser printer includes a drive gear that inputs a drive force thereto, a detection gear that irreversibly moves from a unused position where the detection gear does not engage with the drive gear, to a used position where the detection gear does not engage with the drive gear, through a drive force transmitting position where the detection gear engages with the drive gear, and a contact member formed on the detection gear. Provided in a main frame of the laser printer is an actuator that moves the detection gear from the unused position to the drive force transmitting position as the contact member contacts the actuator when the developing cartridge is set in the main frame of the laser printer.

26 Claims, 9 Drawing Sheets

DEVELOPING CARTRIDGE, PROCESS UNIT, AND IMAGE FORMING APPARATUS

Matter enclosed in heavy brackets [ ] appears in the original patent but forms no part of this reissue specification; matter printed in italics indicates the additions made by reissue.

This application claims priority from JP2003-206595, filed Aug. 7, 2003, the entire disclosure of which is incorporated herewith by reference thereto.

BACKGROUND OF THE INVENTION

1. Field of Invention

The invention relates to a developing cartridge, a process unit provided with the developing cartridge, and an image forming apparatus provided with the developing cartridge or the process unit.

2. Description of Related Art

A known image forming apparatus, such as a laser printer, removably sets therein a toner cartridge into which toner is filled. Such laser printer is provided with a detection device that determines whether the toner cartridge is new, for example, to prevent incorrect detection of the usage limitation of the toner cartridge.

For example, Japanese Laid-Open Patent Publication No. 3-279965 proposes a device that automatically detects whether a cartridge mounted on an image forming apparatus is unused. As a drive transmission system of the cartridge is driven at the time of using the cartridge mounted on the image forming apparatus, a driving interlocking member is displaced on the cartridge. A detection device provided on the image forming apparatus detects whether displacement of the driving interlocking member is a specified amount. The specified amount of the driving interlocking member is associated with an initial state of the cartridge. Thus, a determination as to whether the cartridge is new is automatically made.

In the detection device, the driving interlocking member is always displaced as the drive force is applied to the drive force transmission system of the cartridge. When a cartridge is checked or examined alone, without being set in a printer, on its roller operations after assembly at a production line, the drive force is applied to the drive force transmission system of the cartridge. Accordingly, the shipped cartridge is incorrectly detected as a used cartridge, even when the cartridge is new. Thus, such an operation check leads to an improper determination of the cartridge status as to whether the cartridge is new.

SUMMARY OF THE INVENTION

Accordingly, one aspect of the invention is to provide a developing cartridge that properly determines whether the developing cartridge is new or has been used even after an operation check of rollers of the cartridge is performed after assembly, a process unit provided with the developing cartridge, and an image forming apparatus provided with the developing cartridge or the process unit.

According to one exemplary embodiment, a developing cartridge removably set in an image forming apparatus may include a developing agent containing chamber that contains a developing agent, a drive gear that inputs a drive force thereto, and a detection gear that irreversibly moves from a unused position where the detection gear does not engage with the drive gear, to a used position where the detection gear does not engage with the drive gear, through a drive force transmitting position where the detection gear engages with the drive gear.

With such structures, by inputting the drive force to the detection gear positioned in the unused position where the detection gear does not engage with the drive gear, the operation check may be performed at the production line after the assembly, without moving the detection gear from the unused position. Thus, the quality of the developing cartridge is improved with the operation check, and the new developing cartridge may be correctly determined as new. When the new developing cartridge is used, the drive force may be input to the detection gear with the detection gear placed in the drive force transmitting position where the detection gear engages with the drive gear. Accordingly, the detection gear may be irreversibly moved to the used position. Thus, once the new developing cartridge is used, the developing cartridge may be correctly determined as a used cartridge.

BRIEF DESCRIPTION OF THE DRAWINGS

An exemplary embodiment of the invention will be described in detail with reference to the following figures wherein.

DETAILED DESCRIPTION OF PREFERRED EMBODIMENTS

Figure 1:
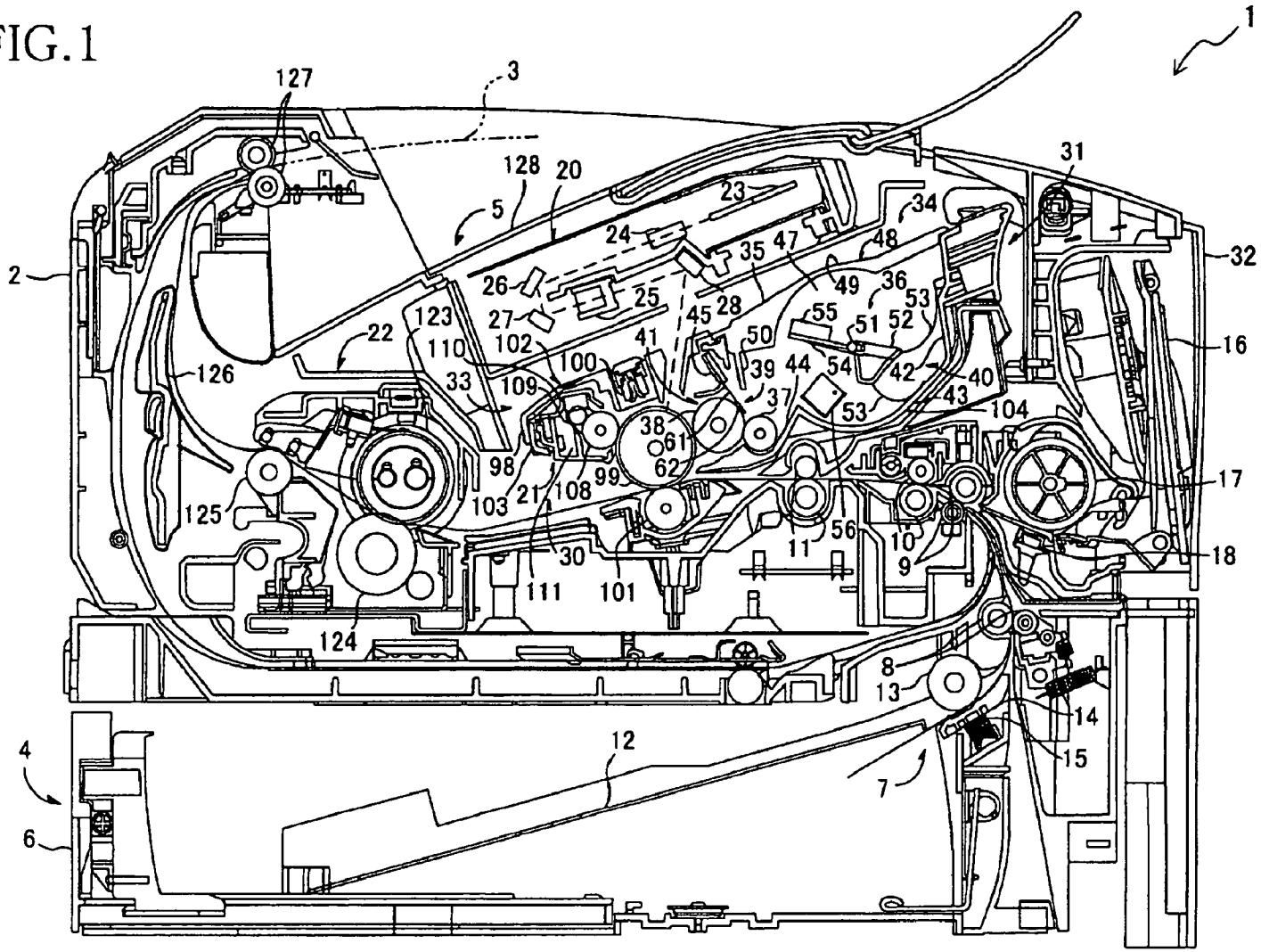
FIG. 1 is a side cross sectional view showing an essential portion of a laser printer as an image forming apparatus.

In FIG. 1, the laser printer 1 is an electrophotographic laser printer that forms an image in a non-magnetic single-component development system. The laser printer 1 is provided in a main frame 2 with a feeder section 4 for feeding sheets 3 and an image forming section 5 for forming images on the fed sheets 3.

The feeder section 4 includes a sheet supply tray 6 removably set on a bottom of the main frame 2, a sheet supply mechanism portion 7 disposed at one side (front side) of the sheet supply tray 6 (hereinafter an opposite side to the front side is referred to as the rear side), conveying rollers 8, 9, 10 disposed downstream of the sheet supply mechanism portion 7 in a sheet feeding direction, and register rollers 11 disposed downstream of the conveying rollers 8, 9, 10 in the sheet feeding direction.

The sheet supply tray 6 is of a box shape with an upper open construction so as to accommodate therein a stack of sheets 3. The sheet supply tray 6 is slidable substantially horizontally to the bottom of the main frame 2. A sheet mount plate 12 is provided in the sheet supply tray 6 so as to allow the sheets 3 to be stacked on the sheet mount plate 12. The sheet mount plate 12 is pivotally supported on one end far from the sheet supply mechanism portion 7, so that the other end of the sheet mount plate 12 near the sheet supply mechanism portion 7 is movable in a vertically direction. Disposed on the underside of the sheet mount plate 12 is a spring (not shown) that urges the sheet mount plate 12 upwardly. As the amount of sheets 3 stacked on the sheet mount plate 12 increases, the sheet mount plate 12 pivots downward about the one end far from the sheet supply mechanism portion 7, against the urging force of the spring.

The sheet supply mechanism portion 7 includes a pick-up roller 13, a separation pad 14 disposed so as to face the pick-up roller 13, and a spring 15 disposed on an underside of the separation pad 14. In the sheet supply mechanism portion 7, the separation pad 14 is pressed against the pick-up roller 13 by an urging force of the spring 15.

An uppermost sheet 3 on the sheet mount plate 12 is pressed toward the pick-up roller 13 as the sheet mount plate 12 is urged upwardly by the spring. By the rotation of the pick-up roller 13, a leading end portion of the uppermost sheet 3 is nipped between the pick-up roller 13 and the separation pad 14. The sheets 3 are separated one by one in cooperation with the pick-up roller 13 and the separation pad 14. The separated sheet 3 is delivered to register rollers 11 by conveying rollers 8, 9, 10.

The register rollers 11 include a pair of rollers. The register rollers 11 correct the skew of the sheets 3, and then feed the sheets 3 to an image forming position where a photosensitive drum 99 and a transfer roller 101 (described below) contact each other.

The feeder section 4 of the laser printer 1 further includes a multi-purpose tray 16 on which any size of sheets 3 is mountable, a multi-purpose pick-up roller 17 that feeds the sheets 3 mounted on the multi-purpose tray 16, and a multi-purpose separation pad 18 disposed so as to face the multi-purpose pick-up roller 17. The multi-purpose tray 16 is accommodated in a folded manner inside a front cover 32 (described below) when not in use.

The image forming section 5 includes a scanner unit 20, a process unit 21, and a fixing unit 22. The scanner unit 20 is provided in an upper portion of the main frame 2. The scanner unit 20 includes a laser emitting portion (not shown), a polygon mirror 23 that is driven so as to spin, lenses 24, 25, and reflecting mirrors 26, 27, 28. A laser beam, modulated based on image data, is emitted from the laser emitting portion. The laser beam emitted from the laser emitting portion passes through or reflects off of the polygon mirror 23, the lens 24, the reflecting mirrors 26, 27, the lens 25, and the reflecting mirror 28 in order, as indicated by broken lines in FIG. 1, to irradiate a surface of the photosensitive drum 99 (described in detail below) of the process unit 21 with the laser beam.

The process unit 21 is disposed below the scanner unit 20. The process unit 21 is removably set into the main frame 2.

More specifically, the main frame 2 includes a main accommodating portion 30 for accommodating the process unit 21, an opening 31 leading to the main accommodating portion 30 for removably setting the process unit 21 in the main frame 2, and the front cover 32 for covering or uncovering the opening 31.

The main accommodating portion 30 is provided below the scanner unit 20, as a space that accommodates the process unit 21 therein. The opening 31 is formed as a path leading from the main accommodating portion 30 to the front cover 32. The front cover 32 is provided so as to extend from a front face of the main frame 2 to an upper face of the main frame 2. The front cover 32 pivots between an open position where the front cover 32 uncovers the opening 31 and a closed position where the front cover 32 covers the opening 31. With the front cover 32 in the open position, the process unit 21 is removably set into the main accommodating portion 30, through the opening 31.

Figure 2:
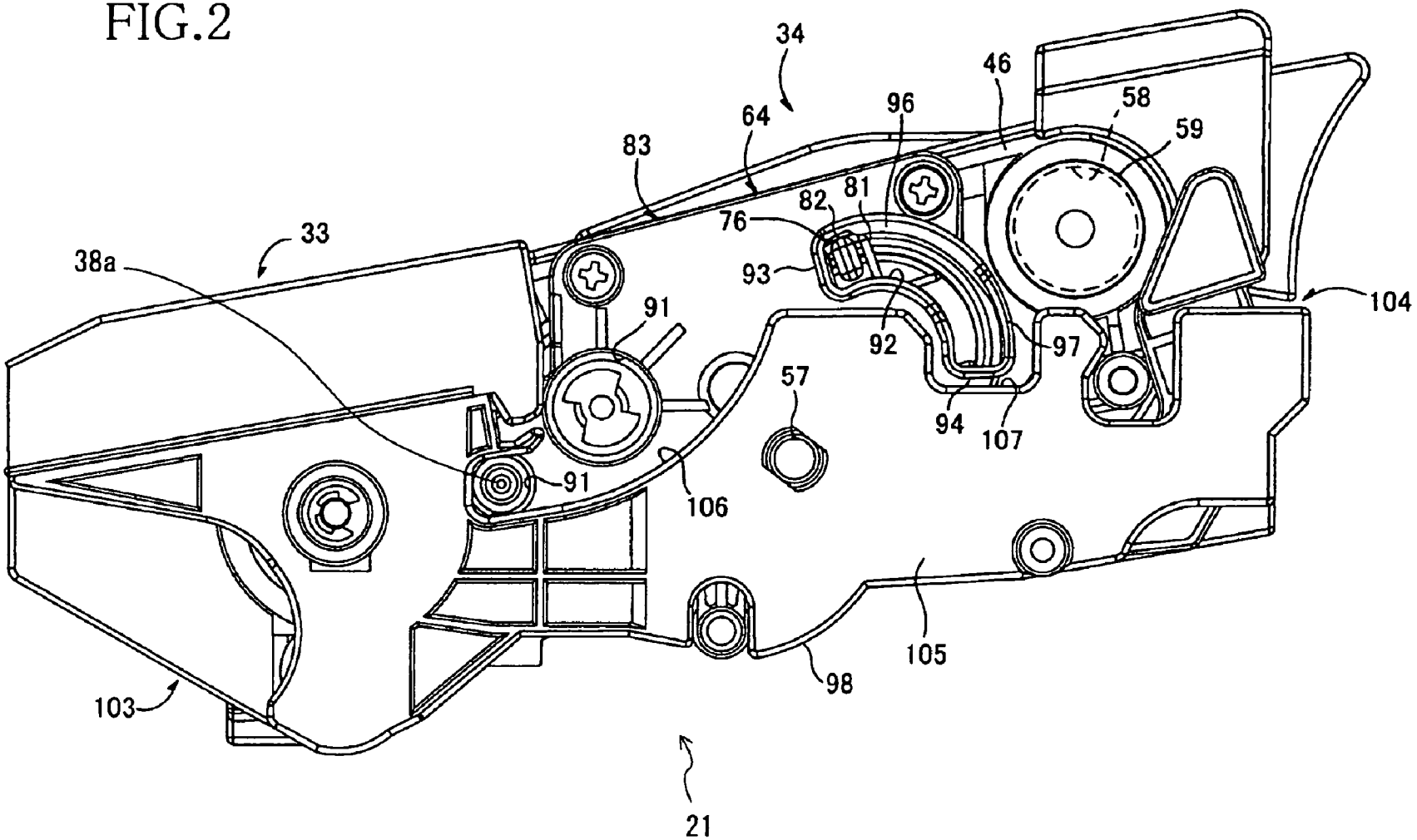
FIG. 2 is a side view of a process unit of the laser printer shown in FIG. 1.

As shown in FIG. 2, the process unit 21 includes a drum cartridge 33 detachably mounted on the main frame 2 and a developing cartridge 34 detachably set in the drum cartridge 33. As shown in FIG. 1, the developing cartridge 34 includes a case 35, and an agitator 36, a supply roller 37, a developing roller 38, and a layer thickness regulating blade 39 that are disposed in the case 35.

The case 35 is provided with a front wall 42, a bottom wall 43 curved rearward from the lower end of the front wall 42, an underside wall 44 extending rearward from the rear end of the bottom wall 43, and a blade supporting wall 45 formed above the underside wall 44.

The front wall 42, the bottom wall 43, the underside wall 44, and the blade supporting wall 45 are integrally formed with side walls 46, 47 provided on each side in a width direction of the front, bottom, underside, and blade supporting walls 42, 43, 44, 45, (that is, a width direction of the case 35 perpendicular to the frontward and rearward direction). A rear portion of the case 35 defined by the underside wall 44, the blade supporting wall 45, and the side walls 46, 47 is open so as to expose a part of the developing roller 38.

A space defined in a front portion of the case 35 by the front wall 42, the bottom wall 43, and the side walls 46, 47 is formed as a toner containing chamber 40. A space defined in a rear portion of the case 35 by the underside wall 44, the blade supporting wall 45, and the side walls 46, 47 is formed as a developing chamber 41.

The case 35 is provided with an upper cover 48 that covers an upward opening portion of the case 35. The upper cover 48 is formed separately from the case 35. An upper plate 49 that covers the upward opening portion of the case 35 is integrally formed with an upper partition 50 that extends downwardly from a rear end portion of the upper plate 49.

The toner containing chamber 40 accommodates, as a developing agent, positively chargeable non-magnetic single component toner. The toner is, for example, polymerized toner that is obtained by copolymerizing polymerizable monomers using a known polymerization method, such as a suspension polymerization method. The polymerizable monomers may be styrene-based monomers, such as styrene, and acrylic-based monomers, such as acrylic acid, alkyl (C1–C4) acrylate, and alkyl (C1–C4) methacrylate. Polymerized toner particles are spherical in shape, having excellent fluidity. Toner particle sizes are approximately 6 to 10 μm. The toner is mixed with a coloring material, such as carbon black, and wax, as well as an external additive, such as silica, to improve the fluidity of the toner.

An agitator 36 is disposed in the toner containing chamber 40. The agitator 36 is formed of a resin material, such as ABS resin, having flexibility. The agitator 36 includes a shaft 51, a wing member 52 provided on the shaft 51, a flexible film member 53 provided on the wing member 52, and a wiper supporting member 54 provided on the shaft 51. The agitator 36 is provided in the toner containing chamber 40 to rotate only clockwise as shown in FIG. 1.

The shaft 51 is disposed between the side walls 46, 47 along the width direction of the case 35 in a substantially central portion of the toner containing chamber 40 in side view. The shaft 51 is a round bar having a diameter of about 3 to 8 mm. The shaft 51 has flexibility and is formed to be longer than a distance between the side walls 46, 47. One end of the shaft 51 near the side wall 46 passes through the side wall 46, protruding outwardly from the toner containing chamber 40. The other end of the shaft 51 near the side wall 47 is rotatably supported by the side wall 47.

The wing member 52 is disposed across the agitator 36 in the axial direction thereof in the toner containing chamber 40, without contacting the side walls 46, 47. The film member 53 is formed of a resin film, such as polyethylene telephthalate. The film, member 53 is attached along the lengthwise direction of the wing member 52. To agitate the toner, the film member 53 is set to such a length that the film member 53 is flexed when making contact with the bottom wall 43.

The wiper supporting member 54 is provided at each end of the shaft 51 in the axial direction thereof, to extend in an opposite direction to the direction in which the wing member 52 extends. A wiper member 55, that wipes off a residual toner amount detecting window 56, is screwed on each wiper supporting member 54. Each wiper member 55 is disposed to elastically contact the side wall 46, 47 to wipe off the residual toner amount detecting window 56. A residual toner amount detecting window 56 is provided on each side wall 46, 47 of the toner containing chamber 40.

Figure 3:
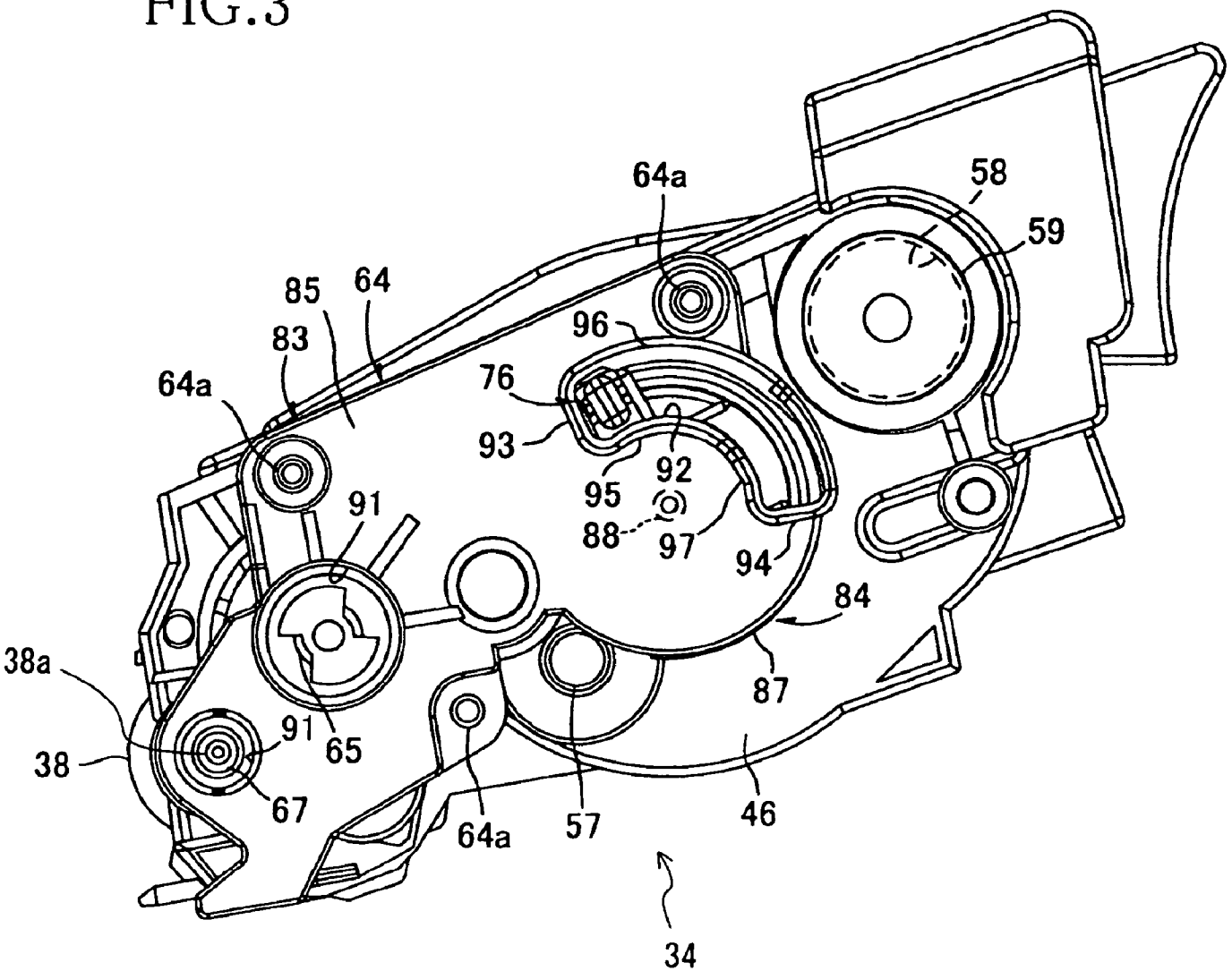
FIG. 3 is a side view of a developing cartridge of the process unit shown in FIG. 2, showing a detection gear is in a unused position.

The residual toner amount detecting windows 56 are provided on the side walls 46, 47 so as to face each other, at a lower rear side of the toner containing chamber 40. As shown in FIG. 3, a cylindrical light transmission portion 57 is provided on an outer surface of the side wall 46, 47 for each residual toner amount detecting window 56.

A toner filling port 58 is provided on the side wall 46 of the toner containing chamber 40. The toner filling port 58 is formed into a substantially round shape. The toner filling port 58 passes through the side wall 46 in the thickness direction thereof. The toner filling port 58 is covered with a cap 59 with the toner filled into the toner containing chamber 40.

The supply roller 37, the developing roller 38, and the layer thickness regulating blade 39 are disposed in the developing chamber 41, as shown in FIG. 1. The supply roller 37 is disposed on a rear portion of the toner containing chamber 40, along the width direction of the case 35. The supply roller 37 is rotatably supported on the side walls 46, 47. The supply roller 37 is rotatable in a direction opposite to a rotating direction of the agitator 36. The supply roller 37 includes a metal roller shaft covered by a roller portion formed of conductive urethane sponge.

The developing roller 38 is disposed behind the supply roller 37, along the width direction of the case 35. The developing roller 38 is also rotatably supported on the side walls 46, 47 to expose a part of the developing roller 38 from an opening formed on a rear portion of the case 35. The developing roller 38 is rotatable in the same direction as the supply roller 37.

The developing roller 38 includes a metal roller shaft covered by a roller portion formed of a conductive elastic material. More specifically, the roller portion of the developing roller 38 is formed of conductive urethane rubber or silicone rubber including fine carbon particles. A surface of the roller portion of the developing roller 38 is coated with urethane rubber or silicone rubber including fluorine. A power supply (not shown) is connected to the roller shaft of the developing roller 38, to apply a development bias during development.

The supply roller 37 and the developing roller 38 are disposed so as to face each other. The supply roller 37 and the developing roller 38 contact each other such that the supply roller 37 applies some pressure to the developing roller 38. At a contact portion where the supply roller 37 and the developing roller 38 contact each other, the supply roller 37 and the developing roller 38 rotate or move in the opposite directions from each other.

The layer thickness regulating blade 39 is disposed above the supply roller 37 between positions where the developing roller 38 faces the supply roller 37 and the photosensitive drum 28 in the rotating direction of the developing roller 38. The regulating blade 39 is supported by the blade supporting wall 45 of the case 35.

The regulating blade 39 is disposed along an axial direction of the developing roller 38 to face the developing roller 38. The regulating blade 39 includes a plate spring member 61, and a pressing portion 62 attached to one end of the plate spring member 61 so as to contact the developing roller 38. The pressing portion 62 is formed of insulating silicone rubber. With the plate spring member 61 supported by the blade supporting wall 45, the pressing portion 62 presses the surface of the developing roller 38 with the elasticity of the plate spring member 61.

Figure 4:
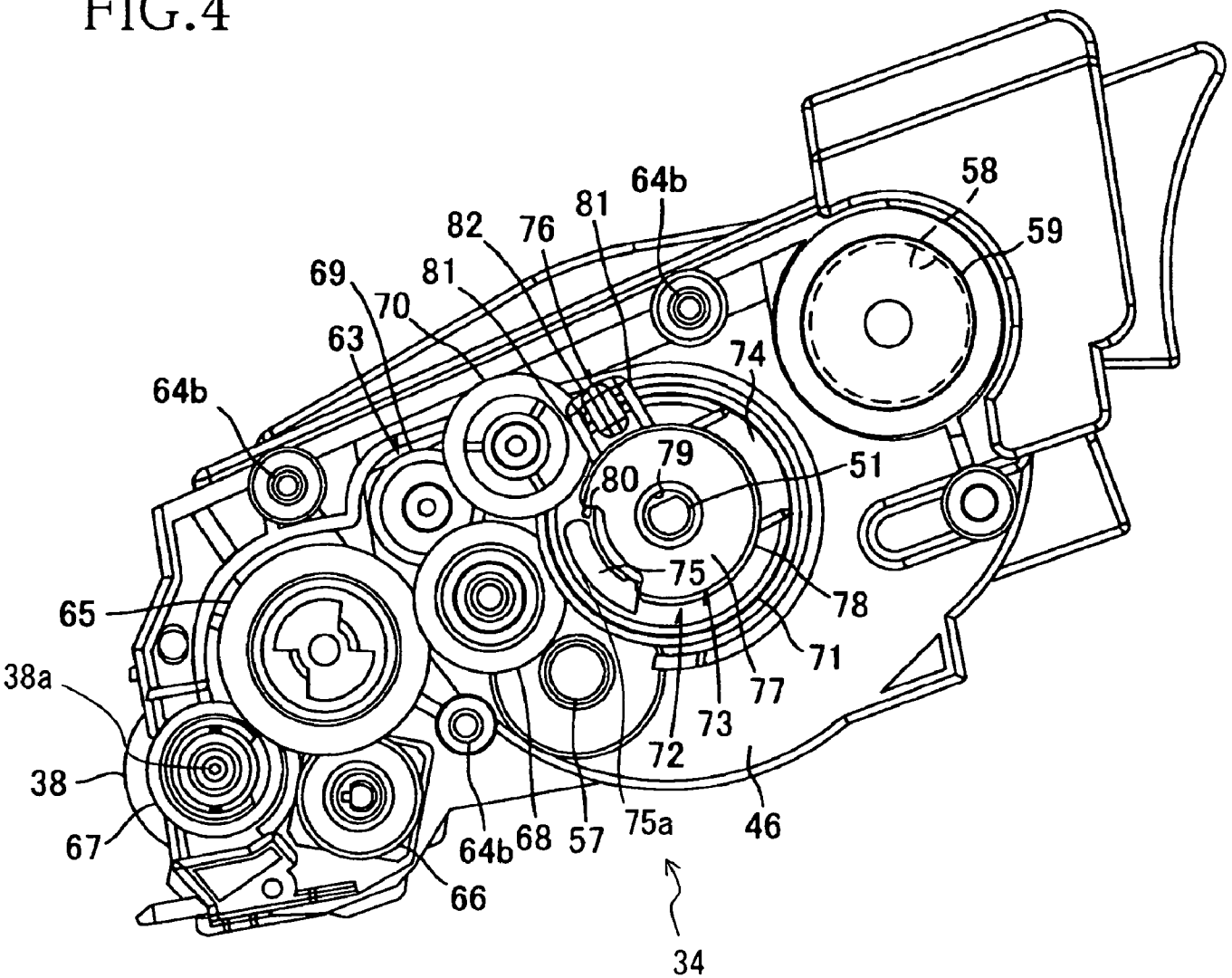
FIG. 4 is a side view of the developing cartridge shown in FIG. 3 in which a cover member thereof is removed.

The developing cartridge 34 is provided with a gear mechanism portion 63, as shown in FIG. 4, that drives the agitator 36, the supply roller 37, and the developing roller 38 to rotate, and a cover member 64, as shown in FIG. 3, that covers the gear mechanism portion 63.

The gear mechanism portion 63 is disposed on an outer face of the side wall 46 of the developing cartridge 34, as shown in FIG. 4. The gear mechanism portion 63 includes an input gear 65, a supply roller drive gear 66, a developing roller drive gear 67, a first intermediate gear 68, a second intermediate gear 69, a third intermediate gear 70, as a drive gear, an agitator drive gear 71 and a detection gear 72.

The input gear 65 is rotatably provided on an outer face of the side wall 46 between the developing roller 38 and the agitator 36. Drive force from a motor (not shown) is input to the input gear 65.

The supply roller drive gear 66 is mounted on an end of the roller shaft of the supply roller 37. The supply roller drive gear 66 is provided below the input gear 65, to engage with the input gear 65.

The developing roller drive gear 67 is mounted on an end of the roller shaft of the developing roller 38. The developing roller drive gear 67 is provided on a rear side of the input gear 65, to engage with the input gear 65.

The first intermediate gear 68 is a two-stage gear rotatably provided on the outer face of the side wall 46 at an front side of the input gear 65. An external gear of the first intermediate gear 68 engages with the input gear 65. An internal gear (not shown) of the first intermediate gear 68 engages with an internal gear of the second intermediate gear 69 (described below). The external and internal gears of the first intermediate gear 68 are concentrically and integrally formed.

The second intermediate gear 69 is a two-stage gear rotatably provided on the outer face of the side wall 46 above the first intermediate gear 68. An external gear of the second intermediate gear 69 engages with an external gear of the third intermediate gear 70 (described below). An internal gear (not shown) of the second intermediate gear 69 engages with the internal gear of the first intermediate gear 68. The external and internal gears of the second intermediate gear 69 are concentrically and integrally formed.

The third intermediate gear 70 is a two-stage gear rotatably provided on the outer face of the side wall 46 at an front side of the second intermediate gear 69. An external gear of the third intermediate gear 70 engages with the external gear of the second intermediate gear 69 and the detection gear 72. An internal gear (not shown) of the third intermediate gear 70 engages with the agitator drive gear 71. The external and internal gears of the third intermediate gear 70 are concentrically and integrally formed.

The agitator drive gear 71 is disposed on a lower front side of the third intermediate gear 70, to engage with the internal gear of the third intermediate gear 70. The agitator drive gear 71 is mounted on an end of the shall 51 of the agitator 36 passing through the side wall 46.

The detection gear 72 is concentric with the agitator drive gear 71 and is mounted on an end of the shaft 51 of the agitator 36 outwardly of the agitator drive gear 71 in an axial direction of the shaft 51 to overlap with the agitator drive gear 71.

The detection gear 72 is integrally formed with a main body 73, a guide member 74, a partly tooth missing gear 75, and a contact member 76, as a determination member. The main body 73 is integrally formed with a side plate 77 of a substantially round shape in side view, and a cylindrical portion 78 of a substantially cylindrical shape that is bent toward the agitator drive gear 71 from an edge of the side plate 77.

A round hole 79, that passes through the side plate 77 in a thickness direction thereof, is formed at a substantially central portion of the side plate 77. The hole 79 is fitted over an end of the shaft 51 of the agitator 36. The side plate 77 is secured at the end of the shaft 51 of the agitator 36, by the hole 79. Accordingly, as the shall 51 of the agitator 36 rotates, the detection gear 72 rotates therewith. A supporting shaft 88 (described below) of the cover member 64 is fitted into the hole 79.

The cylindrical portion 78 is formed with a cut-out portion 80 where the cylindrical portion 78 is partly cut out in a circumferential direction thereof.

The guide member 74 is formed in the cylindrical portion 78 opposite to the cut-out portion 80 with respect to the hole 79. The guide member 74 is of a substantially arc shape in side view, with approximately the same width as the cut-out portion 80. The guide member 74 protrudes from the cylindrical portion 78 in substantially a radial direction of the side plate 77.

The partly tooth missing gear 75 includes a tooth portion 75a whose one end is connected to an end of the cut-out portion 80 of the cylindrical portion 78. The tooth portion 75a is of a substantially arc shape extending in a circumferential direction of the cylindrical portion 78 from the end of the tooth portion 75a. The tooth portion 75a has a length to engage with the third intermediate gear 70 only when the detection gear 72 is in a drive force transmitting position, which will be described in detail below. The other end of the tooth portion 75a is a free end that is not connected to the other end of the cut-out portion 80.

The contact member 76 is disposed between the guide member 74 and the tooth portion 75a in the circumferential direction of the cylindrical portion 78. The contact member 76 includes a supporting portion 81 and a contact portion 82 supported by the supporting portion 81. The supporting portion 81 is formed to extend outwardly from the cylindrical portion 78 in substantially the radial direction of the side plate 77.

Figure 5:
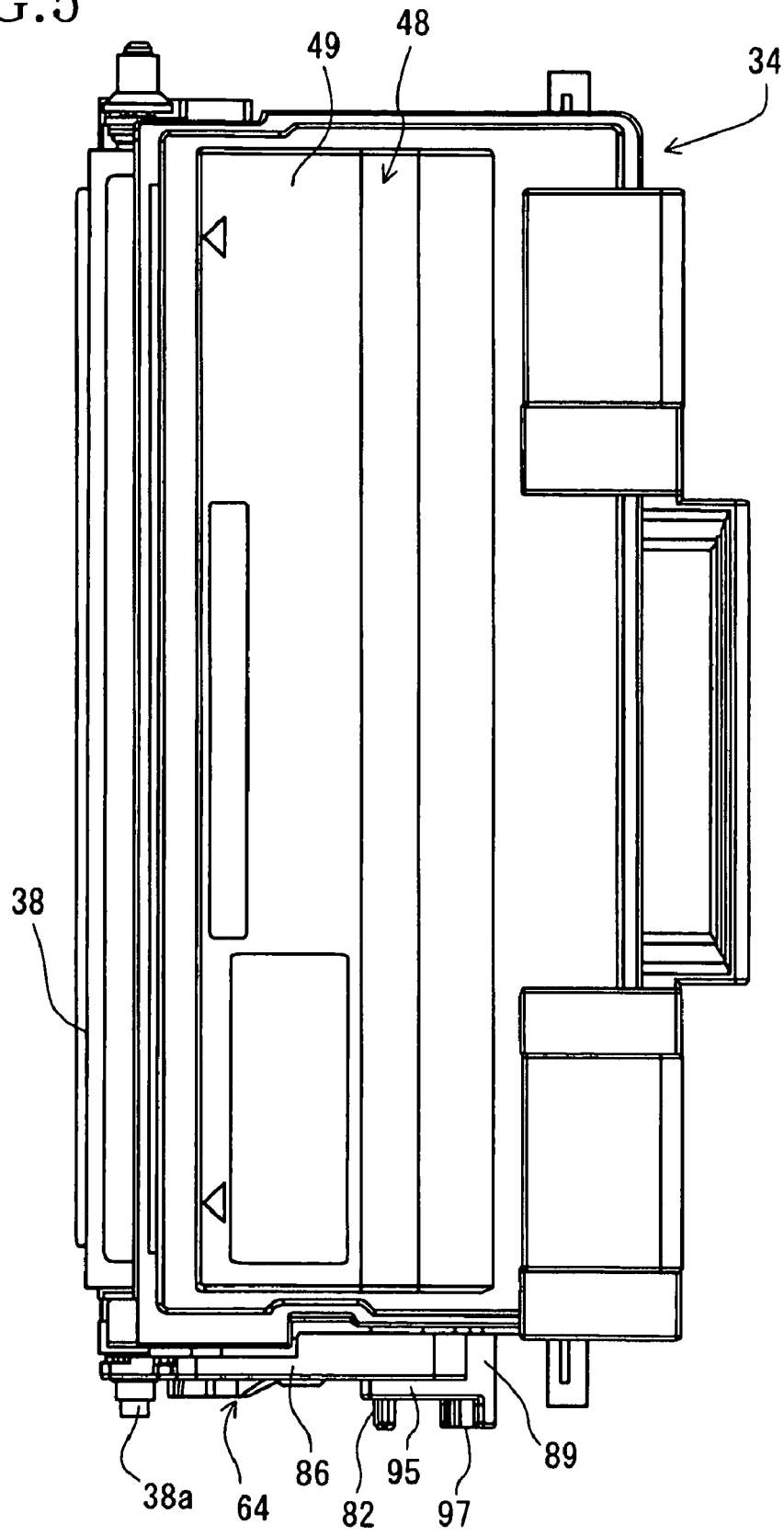
FIG. 5 is a top plan view of the developing cartridge shown in FIG. 3.

The contact portion 82 is of a substantially rectangular shape in plan view, as shown in FIG. 5. The contact portion 82 is formed such that one end thereof is connected to an end of the supporting portion 81 far from the cylindrical portion 78 and extends outwardly toward the axial direction of the shaft 51 of the agitator 36.

The detection gear 72 is mounted on an end of the shall 51 of the agitator 36 extending from the side wall 46 of the developing cartridge 34, first to place the detection gear 72 in a unused position where the tooth portion 75a of the detection gear 72 is not engaged with the third intermediate gear 70, and the tooth portion 75a is disposed upstream of the third intermediate gear 70 in a rotating direction of the shaft 51.

As shown in FIG. 3, the cover member 64 is disposed to cover the gear mechanism portion 63, on an outer face of the side wall 46 of the developing cartridge 34. The cover member 64 includes a rear cover portion 83 that covers the input gear 65, the supply roller drive gear 66, the developing roller drive gear 67, the first intermediate gear 68, the second intermediate gear 69, and the third intermediate gear 70, and a front cover portion 84 that covers the agitator drive gear 71 and the detection gear 72. The rear cover portion 83 and the front cover portion 84 are integrally formed.

The rear cover portion 83 includes a rear plate portion 85 disposed outward of the input gear 65, the supply roller drive gear 66, the developing roller drive gear 67, the first intermediate gear 68, the second intermediate gear 69, and the third intermediate gear 70, and a rear leg portion 86 (as shown in FIG. 5) that is bent from an edge of the rear plate portion 85 toward the side wall 46 of the developing cartridge 34. The rear plate portion 85 and the rear leg portion 86 are integrally formed. The rear cover portion 83 is formed with shall holes 91 that expose the respective shafts of the input gear 65 and the developing roller drive gear 67.

The front cover portion 84 includes a disc portion 87 that is formed in a substantially disc shape and that is disposed outward of the agitator drive gear 71 and the detection gear 72, and a front leg portion 89 (as shown in FIG. 5) that is bent from an edge of the disc portion 87 toward the side wall 46 of the developing cartridge 34. The disc portion 87 and the front leg portion 89 are integrally formed. Formed on the disc portion 87 is a slot 92 of a substantially arc shape having one end 93 disposed on the upper rear side and the other end 94 disposed on the lower front side.

More specifically, the slot 92 exposes the contact portion 82 in the disc portion 87. The slot 92 is formed into a substantially arc shape in plane view along which the contact portion 82 moves. The one end 93 of the slot 92 is associated with a position of the contact portion 82 when the tooth portion 75a is positioned in the unused position. The other end 94 of the slot 92 is associated with a position of the contact portion 82 when the tooth portion 75a is positioned in a used position, which will be described below. The slot 92 is provided with a guide wall 95 formed along the slot 92, an extended portion 97 connected to the guide wall 95, and a resistance application portion 96.

The guide wall 95 is provided on the disc portion 87 to surround the slot 92 and to guide the contact portion 82 along its movement path. The guide wall 95 extends outwardly in the same direction as the contact portion 82 protrudes from the disc portion 87, to expose the contact portion 82 from the guide wall 95 by a predetermined length, as shown in FIG. 5. The extended portion 97 is provided on the guide wall 95 on the side of the other end 94 of the slot 92.

The extended portion 97 is formed on the guide wall 95 on the other side of the other end 94 of the slot 92, into a substantially "U" shape in side view. The extended portion 97 covers the contact portion 82 along the longitudinal direction thereof. The height from the disc portion 87 to the extended portion 97 is substantially equal to the length from the disc portion 87 to the end of the contact portion 82.

As shown in FIG. 3, a resistance application portion 96 is formed from a portion near the one end 93 to a portion near the other end 94, to protrude slightly inwardly toward the slot 92 from an upper edge of the slot 92. The resistance application portion 96 regulates the width of the slot 92, to apply resistance to the contact portion 82 while the contact portion 82 is moving along the slot 92.

The disc portion 87 is provided with the supporting shaft 88 that supports the detection gear 72 at a substantially central portion of an inner side of the disc portion 87 that faces the side wall 46 of the developing cartridge 34. The supporting shaft 88 is fitted into the hole 79 of the detection gear 72 and rotatably supports the detection gear 72.

The front leg portion 89 extends from an edge of the disc portion 87 toward the side wall 46 of the developing cartridge 34, to cover the agitator drive gear 71 and the detection gear 72, as shown in FIG. 5. The front leg portion 89 is provided so as to guide the guide member 74 of the detection gear 72 when the detection gear 72 rotates together with the shaft 51 of the agitator 36, as well as to protect the teeth portion 75a of the detection gear 72.

Screw holes 64a are formed in the cover member 64 at an upper rear portion, an upper front portion, and a lower central portion. In association with the screw holes 64a formed on the cover member 64, screw holes 64b are formed in the side wall 46 of the developing cartridge 34.

The shafts of the input gear 65 and the developing roller drive gear 67 are fitted into the relevant shaft holes 91 formed in the cover member 64. The supporting shaft 88 of the cover member 64 is fitted into the hole 79 formed in the side plate 77 of the main body 73. With the contact portion 82 of the detection gear 72 exposed from the slot 92 of the cover member 64, the cover member 64 is screwed on the side wall 46 of the developing cartridge using the screw holes 64a, 64b.

With the cover member 64 secured on the side wall 46, the contact portion 82 is exposed front the slot 92 at the one end 93.

As shown in FIG. 1, the drum cartridge 33 includes a drum frame 98, as a photosensitive member frame, a photosensitive drum 99 disposed in the drum frame 98, a scorotron charger 100, a transfer roller 101, and a cleaning unit 102.

As shown in FIG. 2, a rear portion of the drum frame 98 is formed as a drum accommodating portion 103 that accommodates the photosensitive drum 99, the scorotron charger 100, the transfer roller 101, and the cleaning unit 102. A front portion of the drum frame 98 is open upwardly and formed as a process accommodating portion 104 that removably accommodates the developing cartridge 34. Formed on a side wall 105 of the drum frame 98 are a guide portion 106, that guides each shaft of the input gear 65 and the developing roller drive gear 67, and a receiving portion 107 formed to the front side of the guide portion 106. The guide portion 106 is formed as a cut-off portion of a substantially sector shape in side view, curving downwardly toward the rear side from an upper edge of the side wall 105 of the drum frame 98.

The receiving portion 107 is formed in the side wall 105 of the drum frame 98, as a recess curving downwardly. The receiving portion 107 is associated with the slot 92 of the developing cartridge 34 when the developing cartridge 34 is set relative to the drum cartage 33. The receiving portion 107 has a size large enough to receive the extended portion 97 and the contact portion 82.

The photosensitive drum 99 is disposed behind the developing roller 38 to face the developing roller 38, as shown in FIG. 1. The photosensitive drum 99 is disposed along a width direction of the drum frame 98, and rotatably supported at each end of the drum frame 98 in the width direction of the drum frame 98. The photosensitive drum 99 includes an aluminum cylindrical drum that is electrically grounded, and a positively chargeable photosensitive coating layer that is made from polycarbonate and formed on the surface of the aluminum cylindrical drum.

The scorotron charger 100 is disposed along the width direction of the drum frame 98 above the photosensitive drum 99 with a predetermined distance therebetween, to prevent the scorotron charger 100 from contacting the photosensitive drum 99. The charger 100 is a positively charging scorotron charger that generates a corona discharge from a tungsten wire. The charger 100 uniformly and positively charges the surface of the photosensitive drum 99.

The transfer roller 101 is disposed along the width direction of the drum frame 98, below the photosensitive drum 99, to face the photosensitive drum 99. The transfer roller 101 is rotatably supported at each end of the drum frame 98 in the width direction of the drum frame 98. The transfer roller 101 includes a metal roller shaft covered by a roller portion formed of conductive rubber. The roller shaft is connected to a power source (not shown). A transfer bias is applied to the roller shaft of the transfer roller 101 to transfer the toner onto the sheet 3.

The cleaning unit 102 is disposed in a rear portion of the drum accommodating portion 103, opposite to the developing roller 38 with respect to the photosensitive drum 99. The cleaning unit 102 includes a first cleaning roller 108, a second cleaning roller 109, a scraping sponge 110, and a paper powder reservoir 111.

The first cleaning roller 108 is disposed along the width direction of the drum frame 98 to face the photosensitive drum 99. The first cleaning roller 108 is rotatably supported at each end of the drum frame 98 in the width direction of the drum frame 98. A cleaning bias is applied to the first cleaning roller 108 during cleaning for removing the toner remaining on the photosensitive drum 99.

The second cleaning roller 109 is disposed along the width direction of the drum frame 98 to face the first cleaning roller 108. The second cleaning roller 109 is rotatably supported at each end of the drum frame 98 in the width direction of the drum frame 98.

The scraping sponge 110 is disposed along the width direction of the drum frame 98 above the second cleaning roller 109 to contact the second cleaning roller 109. The scraping sponge 110 is rotatably supported at each end of the drum frame 98 in the width direction of the drum frame 98. The paper powder reservoir 111 is formed behind the first cleaning roller 108 as a space in the drum accommodating portion 103.

In the laser printer 1, the developing cartridge 34 is set relative to the drum cartridge 33. More specifically, the developing cartridge 34 is set from above into the process accommodating portion 104 in the drum frame 98 of the drum cartridge 33. A shaft 38a of the developing roller 38 protrudes from the shaft hole 91 of the cover member 64 and is inserted above the guide portion 106 into the lowest position in the guide portion 106. The extended portion 97 provided at the other end 94 of the slot 92 in the cover member 64 is received by the receiving portion 107 formed in the drum frame 98. The process unit 21 is constituted by the developing cartridge 34 set relative to the drum cartridge 33, as described above.

The process unit 21 is accommodated in the main accommodating portion 30 of the main frame 2, through the opening 31 that is open when the front cover 32 is positioned in the open position.

Figure 6:
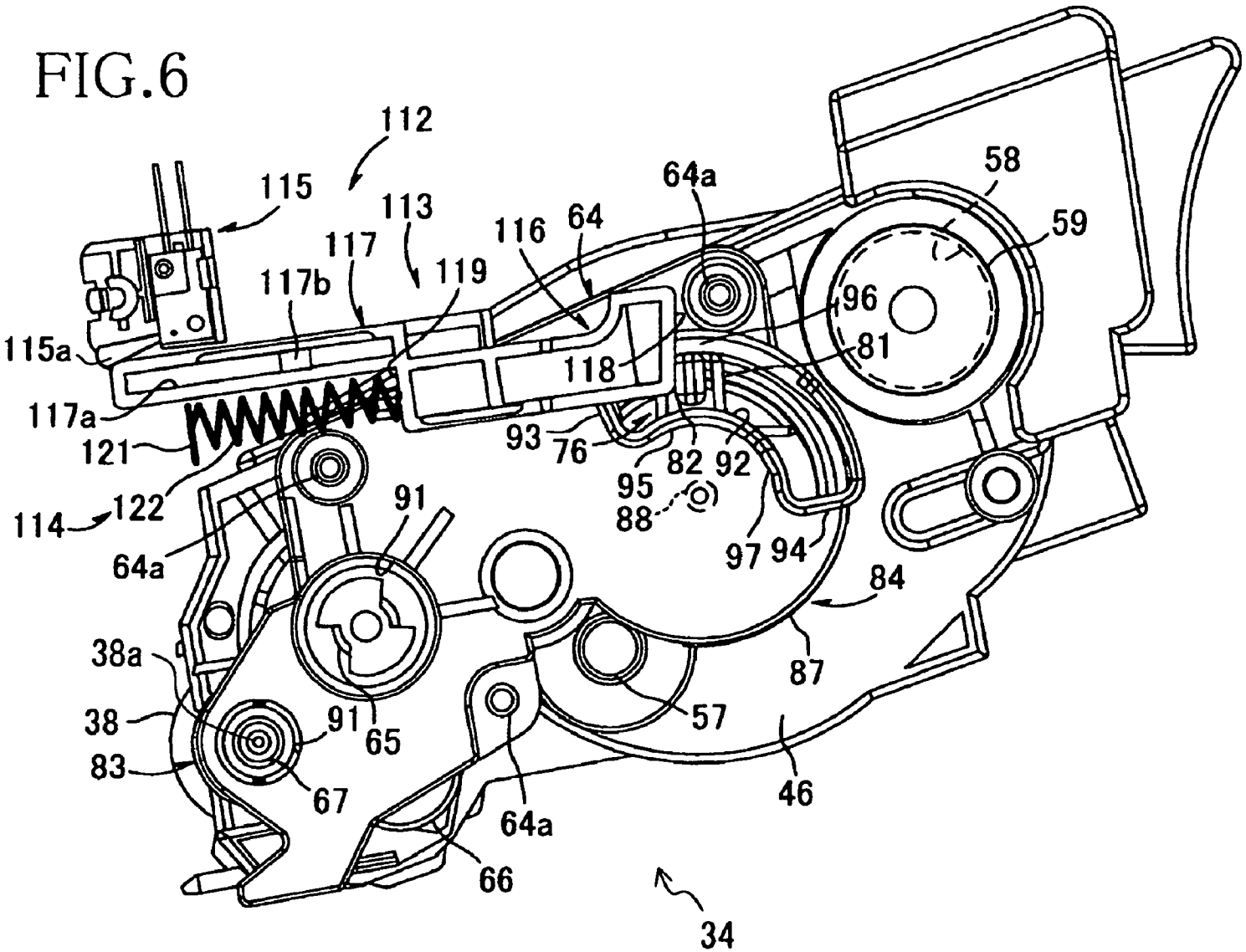
FIG. 6 is a side view of the developing cartridge of the process unit shown in FIG. 2, showing the detection gear is in a drive force transmitting position.

The main frame 2 is provided with a detector 112 that determines whether the developing cartridge 34 is unused or used when the process unit 21 is accommodated in the main accommodating portion 30. The detector 112 is provided on a side wall of the main frame 2 in the main accommodating portion 30. As shown in FIG. 6, the detector 112 includes an actuator 113, as a contacted member, a spring portion 114, and a sensor 115.

The actuator 113 is formed into a substantially lever shape. The actuator 113 is provided on a front side thereof with a pressing portion 116 and on a rear side of the pressing portion 116 with a guide 117. The pressing portion 116 and the guide 117 are integrally formed.

The pressing portion 116 is of a substantially rectangular shape in side view. A contacted surface 118 is formed on a front edge of the pressing portion 116. A pressed surface 119 is formed on a rear edge of the pressing portion 116.

The guide 117 is of an elongated bar shape. The guide 117 is formed to extend rearward from an upper rear edge of the pressing portion 116. The guide 117 includes a guide groove 117a formed to extend along the front and rearward direction.

A guide protrusion 117b, that engages in the guide groove 117a, is formed on the main frame 2. The actuator 113 is slidably attached to the main frame 2 to move in the front and rearward direction, with the guide protrusion 117b engaged in the guide groove 117a.

The spring portion 114 includes a fixed plate 121 fixed to the main frame 2 and a spring 122 whose one end is fixed to the fixed plate 121, as an urging member. The other end of the spring 122 contacts the pressed surface 119 of the pressing portion 116. With an urging force of the spring 122, the actuator 113 is located in a first position where the actuator 113 is constantly urged toward the forward direction.

The sensor 115 is disposed above the rear edge of the guide 117. The sensor 115 includes a detection lever 115a that is movable in the forward and rearward direction. The detection lever 115a is engaged with the guide groove 117a of the guide 117. As the actuator 113 moves in the forward or rearward direction, the detection lever 115a also moves accordingly in the forward or rearward direction. As the detection lever 115a moves in the forward direction, the sensor 115 determines that the developing cartridge 34 is used. As the detection lever 115a moves in the rearward direction, the sensor 115 determines that the developing cartridge 34 is new or unused.

Figure 7:
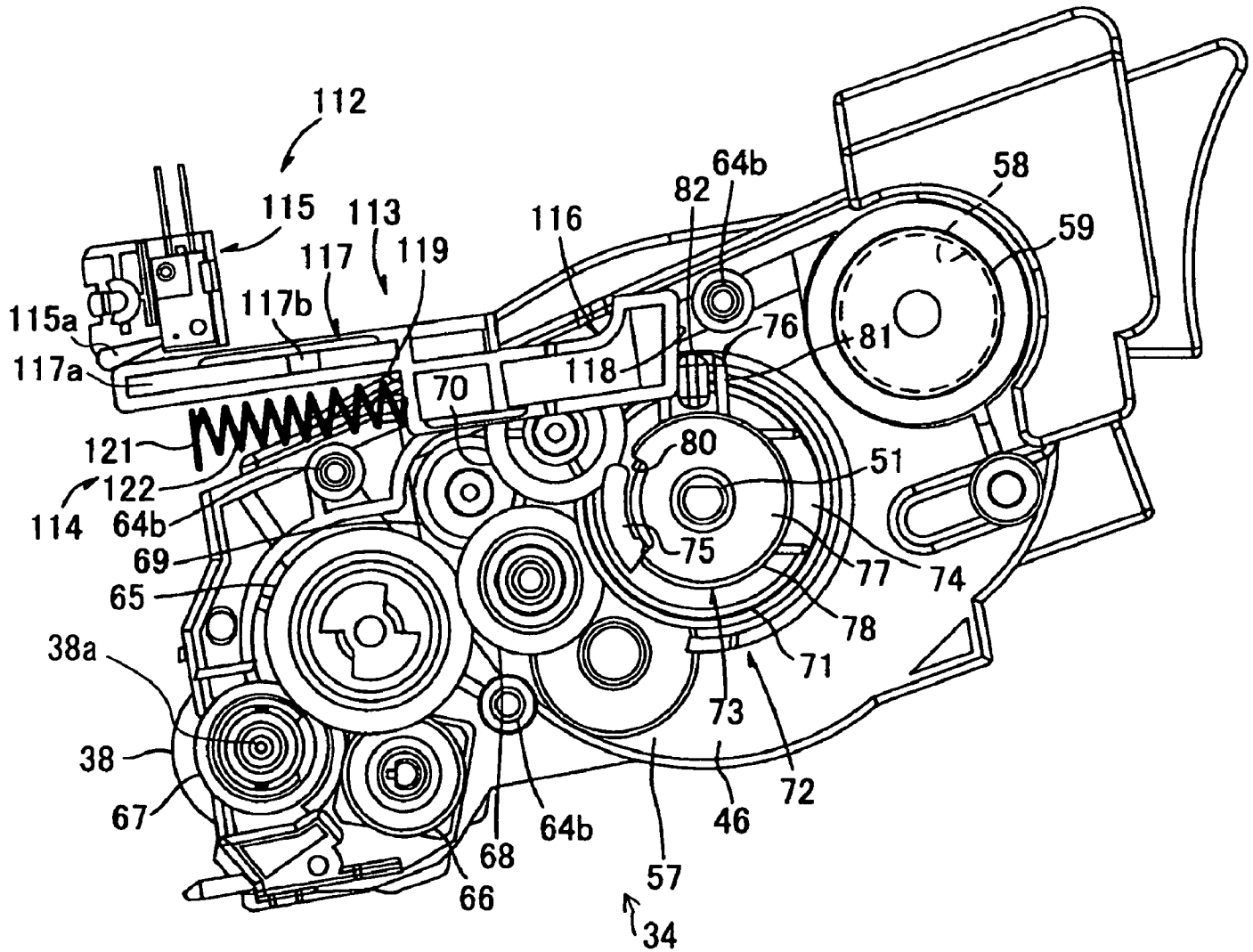
FIG. 7 is a side view of the developing cartridge shown in FIG. 6 in which the cover member is removed.

As the process unit 21 is set into the main accommodating portion 30 of the main frame 2, the contact portion 82 of the detection gear 72 makes contact with the contacted surface 118 of the actuator 113. The contact portion 82 of the detection gear 72 is slightly moved from the one end 93 of the slot 92 toward the other end 94 (toward the front side of the main frame 2), which is an opposite direction to a setting direction of the developing cartridge 34. As shown in FIG. 7, the tooth portion 75a of the detection gear 72 is moved from the unused position where the tooth portion 75a is not engaged with the third intermediate gear 70, to the drive force transmitting position where the tooth portion 75a is engaged with the third intermediate gear 70.

At this time, the actuator 113, contacting the contact portion 82, is located in a second position where the actuator 113 is moved in the rearward direction against the urging force of the spring 122, by a reaction force applied when the actuator 113 contacts the contact portion 82. Thereafter, the detection lever 115a of the sensor 115 is moved in the rearward direction in accordance with the rearward movement of the actuator 113. Thus, it is determined that the developing cartridge 34 is new.

Figure 9:
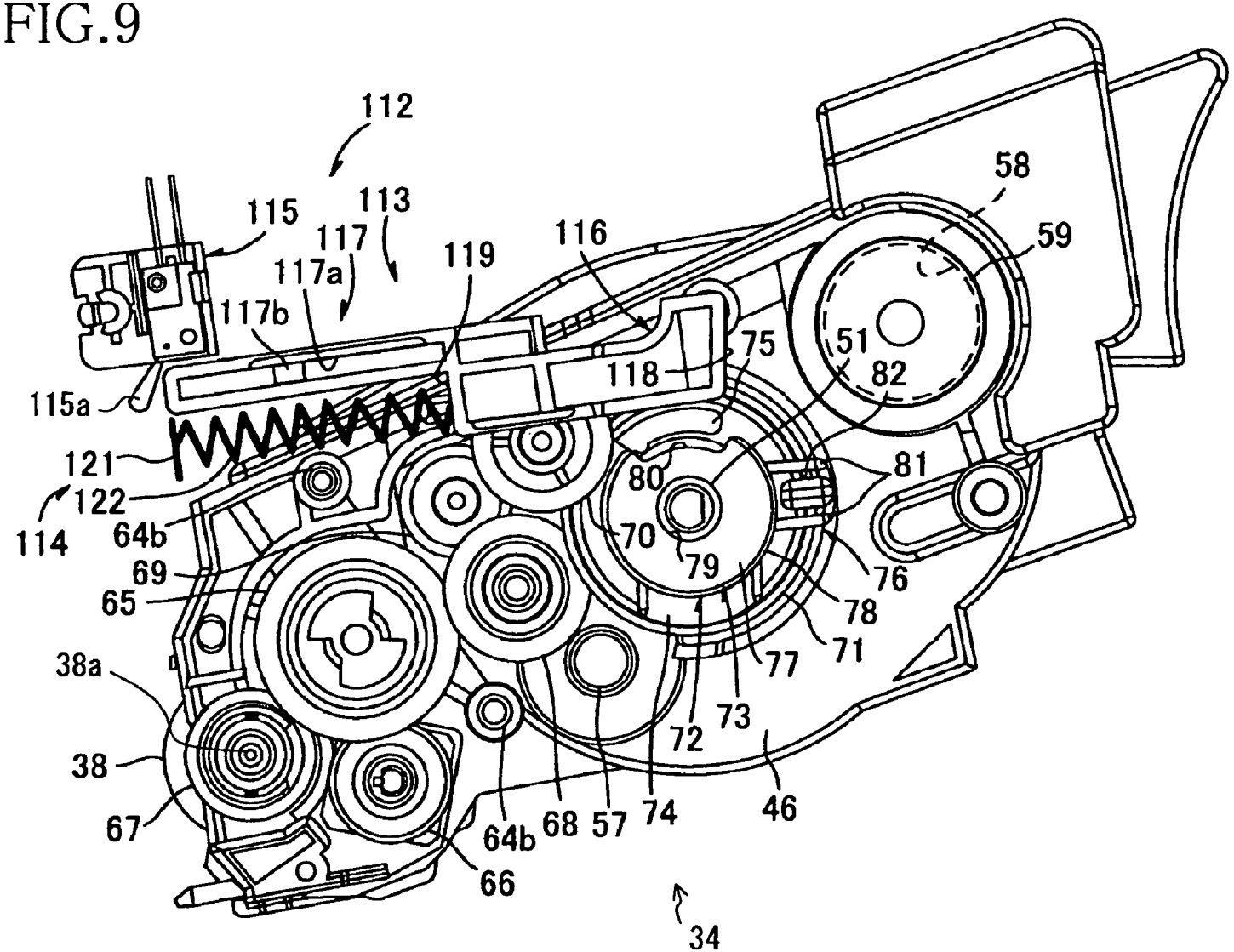
FIG. 9 is a side view of the developing cartridge shown in FIG. 8 in which the cover member is removed.

In the laser printer 1, as the process unit 21 is set into the main accommodating portion 30, a warming-up operation is started in which the agitator 36 is rotated to agitate the toner. As the warming-up operation is started, the drive force is transmitted from the input gear 65 to the detection gear 72 engaged with the third intermediate gear 70 in the drive force transmitting position, through the first intermediate gear 68, the second intermediate gear 69, and the third intermediate gear 70, at the same time as the drive force is transmitted from the input gear 65 to the agitator drive gear 71, through the first intermediate gear 68, the second intermediate gear 69, and the third intermediate gear 70. Thus, the detection gear 72 rotates together with the shaft 51. The detection gear 72 located in the drive force transmission position is moved to the used position where the detection gear 72 is not engaged with the third intermediate gear 70, as shown in FIG. 9.

Figure 8:
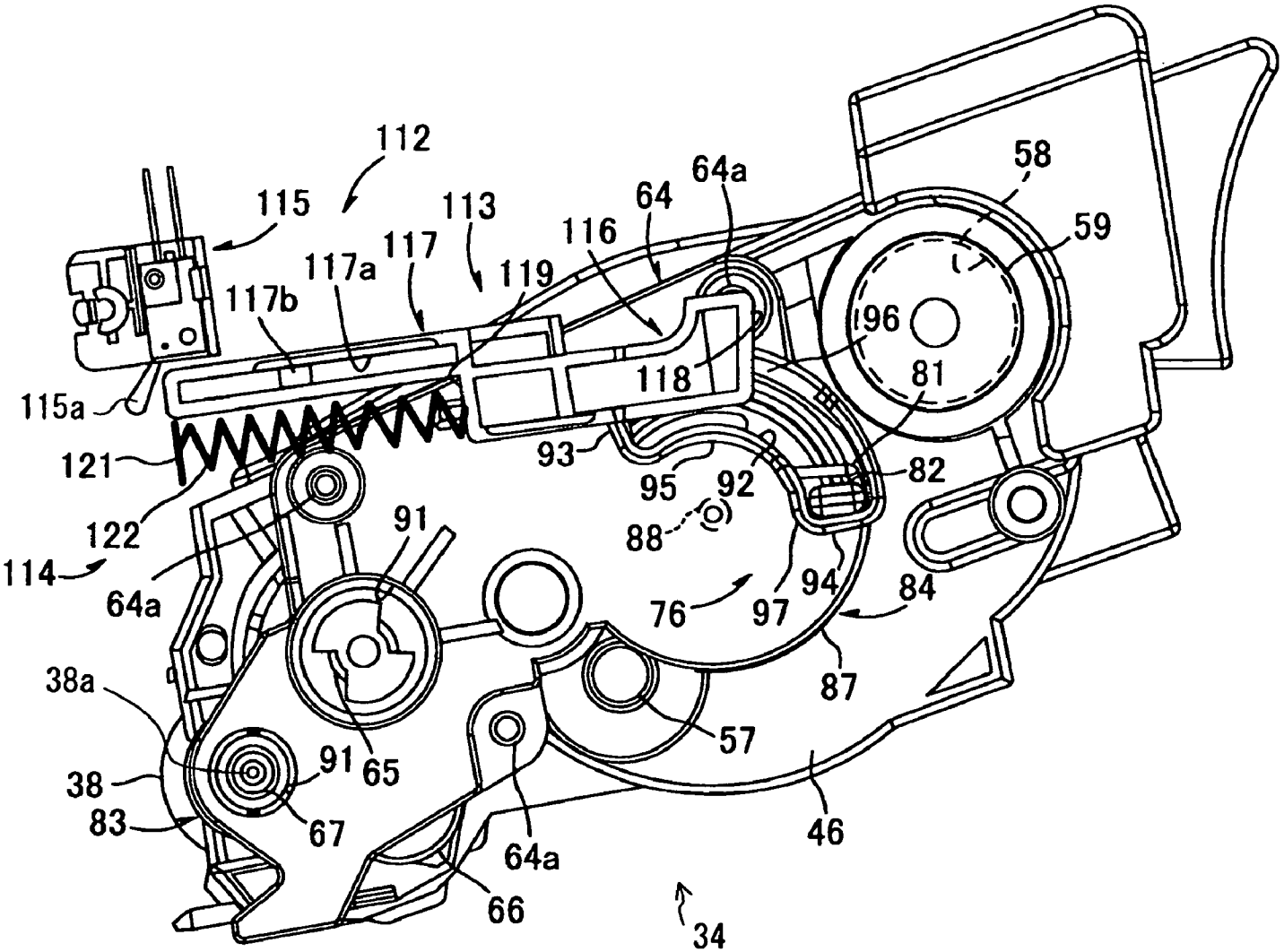
FIG. 8 is a side view of the developing cartridge of the process unit shown in FIG. 2, showing the detection gear is in a used position.

At this time, the contact portion 82 positioned in the slot 92 slightly away from the one end 93, as shown in FIG. 6, is moved along the slot 92 to the other end 94, as shown in FIG. 8, while the contact portion 82 is subjected to the application of resistance by the resistance application portion 96. The contact portion 82 moved to the other end 94 is covered by the extended portion 97.

As the contact portion 82 is moved to the other end 94, the actuator 113 is moved forwardly again to the first position as a result of the urging force of the spring 122. The detection lever 115a of the sensor 115 is moved forwardly in accordance with the movement of the actuator 113 in the forward direction. Thus, it is determined that the developing cartridge 34 is not new.

The agitator 36 only rotates in the clockwise direction. Therefore, the detection gear 72 rotated to the used position does not rotate back to the unused position. In other words, the detection gear 72 is irreversibly rotated to the used position from the unused position. With the detection gear 72 located in the used position, the detection gear 72 slides relative to the shaft 51 to allow the rotation of the shaft 51.

As the warming-up operation is finished, a printing operation is then performed. As shown in FIG. 1, the toner contained in the toner containing chamber 40 is scooped up by the film member 53 according to the rotation of the agitator 36 and conveyed to the developing chamber 41.

The toner conveyed to the developing chamber 41 is supplied to the developing roller 38 by the rotation of the supply roller 37. When the toner is supplied from the supply roller 37 to the developing roller 38, the toner is positively charged by the friction between the supply roller 37 and the developing roller 38.

The charged toner is carried onto the surface of the developing roller 38, and enters between the developing roller 38 and the pressing portion 62 of the regulating blade 39, as the developing roller 38 rotates. At the time when the toner enters between the developing roller 38 and the pressing portion 62, the toner is further frictionally charged and carried on the surface of the developing roller 38 as a thin layer whose thickness has been regulated.

In the drum cartridge 33, the surface of the photosensitive drum 99 is uniformly and positively charged by the scorotron charger 100 while the photosensitive drum 99 rotates. As the surface of the photosensitive drum 99 is selectively exposed to the laser beam emitted from the scanner unit 20 based on image data, an electrostatic latent image is formed on the surface of the photosensitive drum 99.

Thereafter, as the toner, which is carried on the developing roller 38 and is positively charged, is brought into confrontation with the photosensitive drum 99 in accordance with the rotation of the developing roller 38, the toner is supplied to parts of the photosensitive drum 99 selectively exposed to the laser beam where the potential level is lower than the remaining part of the photosensitive drum 99 surface that remains uniformly positively charged. Thus, the toner is selectively carried on the photosensitive drum 99, making the toner image visible.

While the photosensitive drum 99 is rotated, the sheet 3 fed by the register rollers 11 makes contact with the surface of the photosensitive drum 99. The toner carried on the surface of the photosensitive drum 99 is transferred onto the sheet 3 when the sheet 3 passes between the photosensitive drum 99 and the transfer roller 101. The sheet 3 having the toner transferred thereon is fed to the fixing unit 22.

The toner which remains on the photosensitive drum 99, without being transferred onto the sheet 3, is collected by the cleaning unit 102. More specifically, in the cleaning unit 102, a relatively low bias is applied to the first cleaning roller 108 when opposing the portion of the photosensitive drum 99 carrying the toner that was to be transferred onto the sheet 3 but remains on the photosensitive drum 99, to temporarily catch the toner remaining on the photosensitive drum 99.

A relatively high bias is applied to the first cleaning roller 108 when opposing the portion of the photosensitive drum 99 that does not carry toner for transfer onto the sheet 3, that is, when a part of the photosensitive drum 99 corresponding to an interval between two successive sheets 3 contacts the first cleaning roller 108, in order to return the toner temporarily caught by the first cleaning roller 108 to the photosensitive drum 99. Paper powders attached by the sheet 3 to the photosensitive drum 99 when the toner is transferred onto the sheet 3 are also caught by the first cleaning roller 108. The toner returned to the photosensitive drum 99 is collected by the developing roller 38. The paper powders caught by the first cleaning roller 108 are then caught by the second cleaning roller 109 when the first cleaning roller 108 is brought into confrontation with the second cleaning roller 109. The paper powders caught by the second cleaning roller 109 are scraped by the scraping sponge 110 and stored in the paper powder reservoir 111.

The fixing unit 22 is positioned downstream of the process unit 21 in the sheet feeding direction, behind the process unit 21. The fixing unit 22 includes a heat roller 123, a pressure roller 124 and feed rollers 125. The heat roller 123 includes a metal tube accommodating a halogen lamp as a heat source. The pressure roller 124 is disposed below the heat roller 123 to press the heat roller 123 from below. The feed rollers 125 are disposed downstream of the heat roller 123 and the pressure roller 124 in the sheet feeding direction.

The toner transferred onto the sheet 3 is thermally fixed to the sheet 3 while the sheet 3 passes between the heat roller 123 and the pressure roller 124. The sheet 3 is guided by the feed rollers 125 to a guide plate 126 vertically disposed behind the feed rollers 125. Then, the sheet 3 is fed toward discharge rollers 127. The sheet 3 fed to the discharge rollers 127 is discharged onto a discharge tray 128.

In the developing cartridge 34 that is to be mounted in the laser printer 1, the operation check of the rollers of the developing cartridge 34 is performed without setting the developing cartridge 24 in the laser printer 1 at a production line after assembly. At the operation check, the drive force is not input to the detection gear 72 placed in the unused position where the detection gear 72 does not engage with the third intermediate gear 70. Accordingly, the detection gear 72 stays in the unused position during the operation check. Thus, the developing cartridge 34 is correctly determined as a new cartridge 34 after shipment when a user uses a new cartridge, while the quality of the developing cartridge 34 is improved with the operation check. When the new developing cartridge 34 is used, the contact portion 82 is moved, by making contact with the actuator 113, to the drive force transmitting position where the detection gear 72 engages with the third intermediate gear 70. Thereafter, as the warming-up operation is performed, the drive force is input to the detection gear 72 from the third intermediate gear 70, so that the detection gear 72 is irreversibly moved to the used position where the detection gear 72 is not engaged with the third intermediate gear 70. Therefore, once the developing cartridge 34 is used, the developing cartridge 34 is correctly determined as a used cartridge.

The contact portion 82 contacts the actuator 113 as the new developing cartridge 34 is set in the main frame 2 of the laser printer 1. Accordingly, the detection gear 72 is moved from the unused position to the drive force transmitting position. Thereafter, as the drive force is conveyed from the third intermediate gear 70 to the detection gear 72 during the warming-up operation, the detection gear 72 is moved to the used position. In association with the setting of the developing cartridge 34 into the main frame 2 of the laser printer 1, the detection gear 72 is moved from the unused position to the drive force transmitting position. Thus, the developing cartridge 34 is properly determined as a new cartridge.

When the process unit 21 is set in the main accommodating portion 30 of the laser printer 1, the contact portion 82 of the detection gear 72 contacts the actuator 113 provided on the main frame 2 of the laser printer 1. Accordingly, the detection gear 72 is moved from the unused position to the drive force transmitting position. In association with the setting of the process unit 21 into the main frame 2 of the laser printer 1, the detection gear 72 is moved from the unused position to the drive force transmitting position.

When the contact portion 82 contacts the actuator 113, the contact portion 82 moves in the forward direction, which is the opposite direction from an inserting direction of the process unit 21 when the process unit 21 is set in the main frame 2. Thus, reliable contact between the contact portion 82 and the actuator 113 is ensured.

Thus, the detection gear may include a contact member that contacts a contacted member provided in the image forming apparatus, and when the developing cartridge is set in the image forming apparatus, the contact member may contact the contacted member to move the detection gear from the unused position to the drive force transmitting position.

With such a structure, when the developing cartridge is set in the image forming apparatus, the detection gear may be moved from the unused position to the drive force transmitting position by contacting the contact member provided for the detection gear to the contacted member provided in the image forming apparatus. Thus, the movement of the detection gear from the unused position to the drive force transmitting position may be associated with the setting operation of the developing cartridge in the image forming apparatus.

When the contact member contacts the contacted member, the contact member may move to a direction opposite to a setting direction of the developing cartridge in the image forming apparatus.

With such a structure, when the contact member contacts the contacted member, the contact member may move in a direction opposite to the setting direction of the developing cartridge in the image forming apparatus. Thus, the reliable contact between the contact member and the contacted member may be ensured.

In the developing cartridge 34, the detection gear 72 rotates in accordance with the rotation of the shaft 51 for rotating the agitator 36. When the new developing cartridge 34 is used, the detection gear 72 positioned in the drive force transmitting position is rotated to the used position as the agitator 36 is rotated during the warming-up operation. Thus, the new developing cartridge 34 that is once used can he properly determined as the used cartridge.

That is, the detection gear may be placed in the unused position when the developing cartridge is unused, the detection gear may move from the unused position to the drive force transmitting position, in association with a setting operation of the developing cartridge in the image forming apparatus, and the detection gear may move to the used position after the drive force is transmitted from the drive gear to the detection gear.

With such a structure, the detection gear, placed in the unused position, may he moved to the drive force transmitting position when a new developing cartridge is used, in association with a setting operation of the developing cartridge in the image forming apparatus. Thereafter, as the drive force is conveyed from the drive gear to the detection gear, the detection gear may be moved to the used position. Accordingly, as the detection gear may be moved from the unused position to the drive force transmitting position in association with the setting operation of the developing cartridge in the image forming apparatus, determination of the new developing cartridge may be correctly made.

The developing cartridge may further include an agitating member that agitates the developing agent in the developing agent containing chamber and a shaft that rotates the agitating member. The detection gear may rotate in accordance with the rotation of the shaft.

With such a structure, the detection gear may rotate in accordance with the rotation of the shaft for rotating the agitating member. Therefore, the detection gear placed in the drive force transmitting position may be rotated to the used position by rotating the agitating member when the new developing cartridge is used. Thus, once the new developing cartridge is used, the determination of the used developing cartridge may he correctly made.

In the developing cartridge 34, the cover member 64 supports and covers the detection gear 72. Therefore, the number of the components to he used in the laser printer 1 can be reduced, and the structures of the printer 1 can be simplified.

That is, the developing cartridge may further include a cover member that covers and supports the detection gear. The cover member may serve as the support and cover of the detection gear. Thus, the number of the components to be used in the developing cartridge may be reduced, and the structure of the developing cartridge may be simplified.

In the developing cartridge 34, the contact portion 82 is exposed from the slot 92, so that the contact portion 82 reliably contacts the actuator 113.

In the developing cartridge 34, the one end 93 of the slot 92 is associated with a position of the contact portion 82 when the tooth portion 75a of the detection gear 72 is positioned in the unused position. The other end 94 of the slot 92 is associated with a position of the contact portion 82 when the tooth portion 75a of the detection gear 72 is positioned in the used position. Therefore, with the contact portion 82 exposed from the slot That is cover member may include an opening that exposes the contact member and is shaped along a movement path of the contact member. With such a structure, by exposing the contact member from the opening, the contact member and the contacted member may reliably contact each other.

The opening may be formed such that an end of the opening is associated with a position of the contact member when the detection gear is in the unused position, and the other end of the opening is associated with a position of the contact member when the detection gear is in the used position. With such a structure, the contact member may he moved from the unused position to the used position while being exposed from the opening. Thus, smooth movement of the contact member may be ensured.

The contact member may be exposed from the opening at the end the opening up to a predetermined height and an extended portion may be formed at the other end of the opening to a height substantially equal to the predetermined height. With such a structure, the contacted member may readily make contact with the contact member placed in the unused position. External contact to the contact portion placed in the used position may be prevented by the extended portion. Thus, any malfunction of the detection gear may be prevented.

In the developing cartridge 34, the contact portion 82 is of a substantially rectangular shape in plan view. The contact portion 82 is formed such that one end thereof is connected to an end of the supporting portion 81 far from the cylindrical portion 78 and extends outwardly toward the axial direction of the shaft 51 of the agitator 36. The actuator 113 can readily contact the contact portion 82 positioned in the unused position. External contact to the contact portion 82 that is in the used position is prevented by the extended portion 97 covering the contact portion 82. Thus, malfunction of the detection gear 72 can be prevented.

In the developing cartridge 34, the resistance application portion 96 resists return of the detection gear 72 placed in the used position, to the unused position. Thus, irreversible movement of the detection gear 72 is ensured.

A resistance application portion that applies resistance to the contact member when the contact member moves, may be disposed between the one end and the other end of the opening. With such a structure, the resistance application portion may resist return of the detection gear placed in the used position, to the unused position. Thus, irreversible movement of the detection gear may be ensured.

In the developing cartridge 34, the detection gear 72 has the tooth portion 75a. Therefore, engagement of the tooth portion 75a with the third intermediate gear 70 is only made in the drive force transmitting position, but not in the unused and used positions.

The detection gear may be a partly tooth missing gear having a tooth portion that engages with the drive gear only when the detection gear is in the drive force transmitting position. With such a structure, the detection gear may be a partly tooth missing gear, so that the detection gear may not engage with the drive gear in the unused and used positions but engage in the drive force transmitting position.

When the developing cartridge 34 is set in the process accommodating portion 104 of the drum cartridge 33, the contact portion 82 and the extended portion 97 are received by the receiving portion 107 of the drum cartridge 33. Thus, the developing cartridge 34 can be smoothly set in the process accommodating portion 104. The developing cartridge 34 set relative to the drum cartridge 33 can be set in the laser printer 1 as the process unit 21.

In the detector 112 of the laser printer 1, selective movement of the actuator 113 in the first or second position can be detected by the movement of the detection lever 115a of the sensor 115, so that determination as to whether the developing cartridge 34 is new can be made. In the detector 112, by the movement of the actuator 113 from the first position to the second position, the developing cartridge 34 is determined as new.

Thus, a process unit may include a developing cartridge including a developing agent containing chamber that contains a developing agent and a photosensitive member frame that supports a photosensitive member and is formed with a process accommodating portion that accommodates the developing cartridge. In the process unit, the developing cartridge may include a drive gear that inputs a drive force thereto, and a detection gear that is formed with a determination member that irreversibly moves from a unused position where the detection gear does not engage with the drive gear, to a used position where the detection gear does not engage with the drive gear, through a drive force transmitting position where the detection gear engages with the drive gear. The photosensitive member frame may include a receiving portion that is formed in association with a movement path of the determination member and receives the determination member.

With such a structure, by inputting the drive force to the detection gear positioned in the unused position where the detection gear does not engage with the drive gear, an operation check may be performed at the production line after assembly, without moving the detection gear from the unused position. While the quality of the developing cartridge is improved with the operation check, the new developing cartridge may be correctly determined as new. When the new developing cartridge is used, the drive force may be input to the detection gear with the detection gear placed in the drive force transmitting position where the detection gear engages with the drive gear. Accordingly, the detection gear may be irreversibly moved to the used position. Thus, once the new developing cartridge is used, the developing cartridge may be correctly determined as a used cartridge. When the developing cartridge is accommodated in the process accommodating portion of the process unit, the determination member of the detection gear may be received by the receiving portion of the photosensitive member frame. Accordingly, the developing cartridge set relative to the photosensitive member frame may be mounted on an image forming apparatus, as the process unit.

In the process unit, the developing cartridge may include an agitating member that agitates the developing agent in the developing agent containing chamber and a shaft that rotates the agitating member. The detection gear may rotate together with the shaft.

With such a structure, the detection gear may rotate together with the shaft for rotating the agitating member. Therefore, the detection gear placed in the drive force transmitting position may be rotated to the used position by rotating the agitating member when the new developing cartridge is used. Thus, once the new developing cartridge is used, the determination of the used developing cartridge may be correctly made.

In the process unit, the developing cartridge may include a cover member that covers and supports the detection gear. With such a structure, the cover member may serve as the support and cover of the detection gear. Thus, the number of the components to be used in the process unit may be reduced, and the structure of the process unit may be simplified.

In the process unit, the cover member may include an opening that exposes the determination member and is shaped along a movement path of the determination member. With such a structure, by exposing the determination member from the opening, the determination member and the contacted member may reliably contact each other.

In the process unit, the opening may be formed such that one end of the opening is associated with a position of the determination member when the detection gear is in the unused position, and the other end of the opening may be associated with a position of the determination member when the detection gear is in the used position. With such a structure, the determination member may be moved from the unused position to the used position while being exposed from the opening. Thus, smooth movement of the determination member may be ensured.

In the process unit, the determination member is exposed from the opening at the one end of the opening up to a predetermined height and an extended portion is formed at the other end of the opening to a height substantially equal to the predetermined height. With such a structure, the contacted member may readily make contact with the determination member placed in the unused position. External contact to the determination member placed in the used position may he prevented by the extended portion. Thus, malfunction of the detection gear may be prevented.

In the process unit, the receiving portion may be sized to receive the extended portion formed at the opening. With such a structure, the extended portion may be received in the receiving portion. Therefore, the developing cartridge may be smoothly accommodated in the process accommodating portion of the photosensitive member frame.

As such, an image forming apparatus may include a main accommodating portion that removably accommodates therein a process unit including a developing cartridge and a photosensitive member frame that supports a photosensitive member and is formed with a process accommodating portion that accommodates the developing cartridge. The developing cartridge may include a developing agent containing chamber that contains a developing agent, a drive gear that inputs a drive force thereto, and a detection gear that is formed with a determination member that irreversibly moves from a unused position where the detection gear does not engage with the drive gear, to a used position where the detection gear does not engage with the drive gear, through a drive force transmitting position where the detection gear engages with the drive gear. The image forming apparatus may further include a contacted member, provided at the main accommodating portion, that contacts the determination member and moves the detection gear from the unused position to the drive force transmitting position when the process unit is accommodated in the main accommodating portion.

With such a structure, by inputting the drive force to the detection gear positioned in the unused position where the detection gear does not engage with the drive gear, the operation check may be performed at the production line after the assembly, without moving the detection gear from the unused position. As the process unit is accommodated in the main accommodating portion of the image forming apparatus at the time when a new developing cartridge is used, the contacted member may contact the determination member of the detection gear, so that the detection gear may be moved from the unused position to the drive force transmitting position. Thus, the developing cartridge may be correctly determined as a new cartridge, at the time of using a new developing cartridge. As the drive force is input from the drive gear to the detection gear placed in the drive force transmitting position, the detection gear may be irreversibly moved to the used position where the detection gear does not engage with the drive gear. Therefore, once the developing cartridge is used, the developing cartridge may be correctly determined as a used cartridge.

In the image forming apparatus, when the determination member contacts the contacted member, the determination member may move to a direction opposite to a setting direction of the process unit in the image forming apparatus. With such a structure, when the determination member contacts the contacted member, the determination member may move to a direction opposite to the setting direction of the developing cartridge in the image forming apparatus. Thus, the reliable contact between the determination member and the contacted member may be ensured.

In the image forming apparatus, the detection gear may be placed in the unused position when the developing cartridge is unused. The detection gear may move from the unused position to the drive force transmitting position, in association with a setting operation of the process unit in the image firming apparatus. The detection gear may move to the used position after the drive force is transmitted from the drive gear to the detection gear.

With such a structure, the detection gear placed in the unused position may be moved to the drive force transmitting position, when a new developing cartridge is used, in association with a setting operation of the developing cartridge in the image forming apparatus. Thereafter, as the drive force is conveyed from the drive gear to the detection gear, the detection gear may be moved to the used position. Accordingly, as the detection gear may be moved from the unused position to the drive force transmitting position in association with the setting operation of the developing cartridge in the image forming apparatus, determination of the new developing cartridge may be correctly made.

In the image forming apparatus, the contacted member may be movably disposed to a first position and a second position. The image forming apparatus may further include a sensor that determines whether the contacted member is in the first position or the second position, and an urging member that urges the contacted member to place the contacted member in the first position. With such a structure, a determination as to whether the developing cartridge is unused or used may he made by the sensor determining that the contacted member is selectively in the first position or the second position.

In the image forming apparatus, the contacted member may be in the second position against an urging force of the urging member when the detection gear is in the unused position. The contacted member may be placed in the first position in accordance with the urging force of the urging member when the detection gear is moved to the used position. With such a structure, a determination of the new developing cartridge may be made by the movement of the contacted member from the first position to the second position.

Although the exemplary embodiment is described in detail, those skilled in the art will recognize that there are many possible modifications and variations which may be made in the embodiment.

For example, in the embodiment, the sensor 115 determines whether the actuator 113 is located in the first position or the second position with the actuator 113 released from or pressed by the contact portion 82 of the detection gear 72. However, the position of the contact portion 82 of the detection gear 72 may be detected by an optical sensor. The contact portion 82 is formed to extend outwardly in the axial direction the shaft 51 of the agitator 36, so that the position of the contact portion 82 may be readily detected by the optical sensor.

What is claimed is:

1. A developing cartridge, comprising:

a developing agent containing chamber that contains a developing agent;

a drive gear configured to receive a drive force; and a detection gear irreversibly movable from an unused position where the detection gear does not communicate with the drive gear, to a used position where the detection gear does not communicate with the drive gear, through a drive force transmitting position where the detection gear communicates with the drive gear.

2. The developing cartridge according to claim 1, wherein the detection gear is placed in the unused position when the developing cartridge is unused, the detection gear moves from the unused position to the drive force transmitting position, in association with a setting operation of the developing cartridge in an image forming apparatus, and the detection gear moves to the used position after the drive force is transmitted from the drive gear to the detection gear.

3. The developing cartridge according to claim 2, wherein the detection gear includes a contact member, and when the developing cartridge is set in the image forming apparatus, the contact member contacts a contacted member provided in the image forming apparatus so the detection gear is moved from the unused position to the drive force transmitting position.

4. The developing cartridge according to claim 3, further comprising:

an agitating member configured to agitate the developing agent in the developing agent containing chamber; and an agitating member shaft configured to rotate the agitating member, wherein the detection gear rotates in accordance with the rotation of the agitating member shaft.

5. The developing cartridge according to claim 3, further comprising a cover member that supports the detection gear.

6. The developing cartridge according to claim 5, wherein the cover member includes an opening that exposes the contact member and is shaped along a movement path of the contact member.

7. The developing cartridge according to claim 6, wherein the opening is formed such that one end of the opening is associated with a position of the contact member when the detection gear is in the unused position, and the other end of the opening is associated with a position of the contact member when the detection gear is in the used position.

8. The developing cartridge according to claim 7, wherein the contact member is exposed from the opening at the one end of the opening up to a predetermined height and an extended portion is formed at the other end of the opening to a height substantially equal to the predetermined height.

9. The developing cartridge according to claim 7, wherein the cover further includes a resistance application portion, that applies resistance to the contact member when the contact member moves, disposed between the one end and the other end of the opening.

10. The developing cartridge according to claim 1, further comprising an intermediate gear that communicates with the drive gear, wherein the detection gear does not engage with the intermediate gear when the detection gear is in the unused position, and the detection gear engages with the intermediate gear when the detection gear is in the drive force transmitting position.

11. The developing cartridge according to claim 10, wherein the detection gear is a partly teeth missing gear having a tooth portion that engages with the intermediate gear only when the detection gear is in the drive force transmitting position.

12. A process unit, comprising:

a developing cartridge including a developing agent containing chamber that contains a developing agent; and a photosensitive member frame that supports a photosensitive member and is formed with a process accommodating portion that accommodates the developing cartridge, and wherein the developing cartridge includes:

a drive gear that inputs a drive force thereto; and a detection gear that is formed with a determination member that irreversibly moves from an unused position where the detection gear does not communicate with the drive gear, to a used position where the detection gear does not [communiate] *communicate* with the drive gear, through a drive force transmitting position where the detection gear communicates with the drive gear, wherein the photosensitive member frame includes a receiving portion that is formed in association with a movement path of the determination member and receives the determination member.

13. The process unit according to claim 12, wherein the developing cartridge includes an agitating member that agitates the developing agent in the developing agent containing chamber and a shaft that rotates the agitating member, and wherein the detection gear rotates together with the shaft.

14. The process unit according to claim 12, wherein the developing cartridge includes a cover member that supports the detection gear.

15. The process unit according to claim 14, wherein the cover member includes an opening that exposes the determination member and is shaped along a movement path of the determination member.

16. The process unit according to claim 15, wherein the opening is formed such that one end of the opening is associated with a position of the determination member when the detection gear is in the unused position, and the other end of the opening is associated with a position of the determination member when the detection gear is in the used position.

17. The process unit according to claim 16, wherein the determination member is exposed from the opening at the one end of the opening up to a predetermined height and an extended portion is formed at the other end of the opening to a height substantially equal to the predetermined height.

18. The process unit according to claim 17, wherein the receiving portion is formed to receive the extended portion formed at the opening.

19. The process unit according to claim 12, wherein the developing cartridge further includes an intermediate gear that communicates with the drive gear, wherein the detection gear does not engage with the intermediate gear when the detection gear is in the unused position, and the detection gear engages with the intermediate gear when the detection gear is in the drive three transmitting position.

20. An image forming apparatus, comprising: [wherein the detection gear does not engage with the intermediate gear when the detection]

a main accommodating portion that removably accommodates therein a [gear is in the unused position, and the detection gear engages with the intermediate gear when] process unit including a developing cartridge and a photosensitive member frame formed [the detection gear is in the drive force transmitting position.] with a process accommodating portion that accommodates the developing cartridge, the photosensitive member frame supporting a photosensitive member;

wherein the developing cartridge includes:

a developing agent containing chamber that contains a developing agent;

a drive gear that inputs a drive force thereto; and a detection gear that is formed with a determination member that irreversibly moves from an unused position where the detection gear does not communicate with the drive gear, to a used position where the detection gear does not communicate with the drive gear, through a drive force transmitting position where the detection gear communicates with the drive gear; and wherein the image forming apparatus further comprises:

a contacted member, provided at the main accommodating portion, that contacts the determination member and moves the detection gear from the unused position to the drive force transmitting position when the process unit is accommodated in the main accommodating portion.

21. The image forming apparatus according to claim 20, wherein when the determination member contacts the contacted member, the determination member moves to a direction opposite to a setting direction of the process unit in the image forming apparatus.

22. The image forming apparatus according to claim 20, wherein the detection gear is placed in the unused position when the developing cartridge is unused, the detection gear moves from the unused position to the drive force transmitting position, in association with a setting operation of the process unit in the image forming apparatus, and the detection gear moves to the used position after the drive force is transmitted from the drive gear to the detection gear.

23. The image forming apparatus according to claim 20, wherein the contacted member is movable between a first position and a second position, and the image forming apparatus further includes a sensor that determines whether the contacted member is in the first position or the second position, and an urging member that urges the contacted member to place the contacted member in the first position.

24. The image forming apparatus according to claim 23, wherein the contacted member is in the second position against an urging force of the urging member when the detection gear is in the unused position, and the contacted member is placed in the first position in accordance with the urging force of the urging member when the detection gear is moved to the used position.

25. The image forming apparatus according to claim 20, wherein the developing cartridge further includes an intermediate gear that communicates with the drive gear, wherein the detection gear does not engage with the intermediate gear when the detection gear is in the unused position, and the detection gear engages with the intermediate gear when the detection gear is in the driving transmitting position.

*26. The developing cartridge according to claim 1, further comprising:*

*a shaft configured to rotate during operation of the developing cartridge, wherein the detection gear rotates in accordance with the rotation of the shaft.*

* * * * *